United States Patent [19]
Boehmer

[11] 3,890,238
[45] June 17, 1975

[54] WATER SOLUBILITY OF POLYOXYALKYLENE POLYMERS

[75] Inventor: Matthew A. Boehmer, Allen Park, Mich.

[73] Assignee: BASF Wyandotte Corporation, Wyandotte, Mich.

[22] Filed: Dec. 21, 1972

[21] Appl. No.: 317,232

[52] U.S. Cl. .................. 252/1; 252/89; 252/321; 252/358; 252/363.5; 252/389 R; 252/391; 252/395; 252/396; 252/542; 252/DIG. 1
[51] Int. Cl.² .... C09K 3/00; B01F 1/00; C10M 3/22
[58] Field of Search .............. 252/170, 89, 363.5, 1, 252/542, 49.3, 321

[56] References Cited
UNITED STATES PATENTS

| | | | |
|---|---|---|---|
| 3,101,374 | 8/1963 | Patton | 252/89 X |
| 3,321,533 | 5/1967 | Patton | 252/170 X |
| 3,626,559 | 12/1971 | Rossman et al. | 252/89 X |
| 3,718,585 | 2/1973 | Lummus et al. | 252/363.5 X |

Primary Examiner—Herbert B. Guynn
Attorney, Agent, or Firm—Bernhard R. Swick; Joseph D. Michaels; Robert E. Dunn

[57] ABSTRACT

The critical solution temperature, i.e. cloud point, of an aqueous solution of a liquid polyoxyalkylene polymer is raised by adding to the solution an alkali metal salt of an organic thiol acid having at least one —SH group.

5 Claims, No Drawings

WATER SOLUBILITY OF POLYOXYALKYLENE POLYMERS

BACKGROUND OF THE INVENTION

This invention relates to a method raising the critical solution temperature of an aqueous solution of a polyoxyalkylene polymer by adding to the solution an alkali metal salt of an organic thiol acid.

SUMMARY OF THE INVENTION

In accordance with this invention there is provided a method of raising the critical solution temperature of an aqueous solution of a liquid polyoxyalkylene polymer by adding to said solution an alkali metal salt of an organic thiol acid having at least one —SH group.

DESCRIPTION OF THE PREFERRED EMBODIMENT

Polyoxyalkylene polymers have become very valuable in industry because of their suitability for use in surfactant application problems, cutting and grinding fluids, corrosion inhibitor, lubricants and/or defoamers in aqueous systems. The properties of these polymers depend on not only their empirical chemical composition but the arrangement or structure of that chemical composition. It has been found that polyoxyethylene groups in the polymer contribute hydrophilic properties and thus a polyoxyalkylene polymer based entirely on, or largely on, polyoxyethylene groups, is readily soluble in water over a very wide range of concentrations and temperatures. On the other hand, it has been found that the polyoxypropylene groups or higher carbon number polyoxyalkylene groups have a very distinct hydrophobic character with a consequent low water solubility for polyoxyalkylene polymers based entirely or largely on these groups.

This invention is applicable to polyoxyalkylene polymers in general; however, because of ecomonic and use considerations it can be said that the practical limit of this invention is with polyoxyalkylene polymers containing no more than about 40 to 45 percent by weight polyoxyethylene units, the balance of units being polyoxypropylene or higher carbon number units. More striking results are obtained when the polymer contains at most about 20 percent polyoxyethylene units. The balance of the polymer is made up of polyoxyalkylene units wherein the alkylene unit is derived from an alkylene oxide containing three, four, or five carbon atoms or mixtures thereof and an initiator, e.g., ethylene glycol, fatty alcohol, diamine, propylene glycol or water. These polymers are well known in the surfactant art. Illustrative of these polymers and incorporated herein by reference are U.S. Pat. Nos. 2,674,619; 3,101,374; and 2,979,528 wherein polyoxyethylene type terminated polymers are disclosed, and U.S. Pat. Nos. 3,036,118 and 3,340,309 wherein polyoxypropylene terminated polymers are disclosed.

Briefly, U.S. Pat. No. 2,674,619 discloses a class of polyoxyalkylene compounds which have outstanding detergent and surface active properties and in which the hydrophobic element is a polyoxypropylene polymer of at least 900 molecular weight. The polyoxyalkylene compounds are prepared by first condensing propylene oxide with an organic compound containing a plurality of reactive hydrogen atoms to prepare a polyoxypropylene polymer of at least 900 molecular weight, and subsequently condensing ethylene oxide, or its equivalent, therewith. The compounds of this invention conform to the following generic formula:

$$Y[(C_3H_6O)_n — E — H]_x \qquad (A)$$

where

Y is residue of an organic compound containing therein $x$ active hydrogen atoms, $n$ is an integer, $x$ is an integer greater than 1.

The values of $n$ and $x$ are such that the molecular weight of the compound, exclusive of E, is at least 900, as determined by hydroxyl number, E is a polyoxyalkylene chain wherein the oxygen/carbon atom ratio is at least 0.5, and E constitutes 20–90 percent, by weight, of the compound.

In summary, U.S. Pat. No. 2,979,528 discloses polyoxyalkylene nonionic surface active agents of the general class disclosed in U.S. Pat. No. 2,674,619 but where the reactive hydrogen compound employed is one of a specific class of reactive hydrogen compounds, i.e., nitrogen-containing reactive hydrogen compounds. These polyoxyalkylene nonionic detergent compositions constitute a superior class of detergents in several respects when compared to the polyoxyalkylene nonionic detergent compositions of U.S. Pat. No. 2,674,619 as exemplified by those prepared with propylene glycol as the reactive hydrogen compound. Specifically, nitrogen-containing polyoxyalkylene nonionic detergent compositions can be prepared which produce higher detergency effectiveness than that of other propylene glycol-based compositions disclosed in U.S. Pat. No. 2,674,619 regardless of the proportions of propylene oxide and ethylene oxide employed in preparing the latter. The nitrogen-containing compositions have unusually superior detergency effectiveness in relatively cold water, i.e., at 90° F. Typical nitrogen reactive compounds include ammonia, primary alkyl amine, alkylene polyamine and alkanolamine.

The surfactant compositions of U.S. Pat. No. 3,036,130 correspond to the formula, $R(C_2H_4O)_n(C_3H_6O)_mH$ wherein R is the nucleus of the lower molecular weight reactive hydrogen compound, $n$ has a value such that the weight of the oxyethylene groups constitutes about 20 to 90 weight percent of the total oxyethylene-oxypropylene composition and m has a value such that the molecular weight of the oxypropylene chain is at least about 371 and up to about 25,000.

The conjugated polyoxyalkylene compounds of U.S. Pat. No. 3,101,374 conform to the following generic formula: $Y(—P—E—H)_x$ (A)

wherein Y is the nucleus of an organic reactive hydrogen compound containing $x$ reactive hydrogen atoms and having up to 6, inclusive, carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least about 400–900 and up to about 25,000, and E is a hydrophilic heteric polyoxyalkylene chain which (1) contains oxyethylene groups and at least 5 percent, by weight, of higher molecular weight oxyalkylene groups having at least 3 carbon atoms in their structure and (2) has an average oxygen/carbon atom ratio of greater than 0.40, E being present in the composition to the extent that it constitutes from 5 to 90 weight percent of the total composition.

The hydrophobic polyoxyalkylene polymer, which is an intermediate in the preparation in the above compounds, has the following structure: $Y(-P-H)_x$ (B)

wherein Y, P and x are defined as in Formula A above and the molecular weight of the hydrophobic polyoxyalkylene polymer is at least about 400–900 and may range up to 25,000 or higher.

When P in Formula B above is a polymeric chain of oxypropylene groups, the hydrophobic polyoxyalkylene polymer is a polyoxypropylene polymer having the formula:

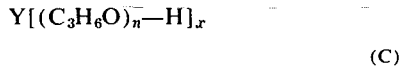

(C)

wherein Y and x are defined as in Formula A above and n is an integer. In an illustrative example, when Y is the nucleus of propylene glycol and P is a polymeric chain of oxypropylene groups, the hydrophobic polyoxypropylene polymer is simply a polyoxypropylene glycol. When Y is the residue of n-propanol, the polyoxypropylene polymer is simply the n-propyl ether of a polyoxypropylene glycol. When Y is the residue of a dibasic organic acid, such as adipic acid, the polyoxypropylene polymer has the following structure:

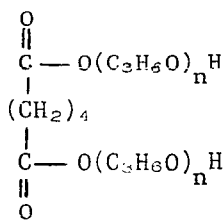

When P of Formula B is a polymeric chain of oxybutylene groups, the hydrophobic polyoxyalkylene polymer has the following structure:

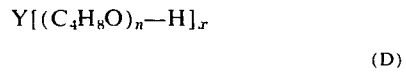

(D)

wherein Y, n and x are defined as previously set forth.

Briefly, the products of U.S. Pat. No. 3,340,309 are a cogeneric mixture of compounds having the formula:

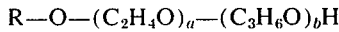

wherein R is a straight chain alkyl group having from 8 to 20 carbon atoms, a has an average value of from 3.75 to 12.75, b has an average value of from 1.7 to 7.0, the ratio of a to b being from 1.8:1 to 2.2:1, from 0 to 10 weight percent of said compounds in said mixture having an R containing 8 carbon atoms, from 0 to 50 weight percent of said compounds in said mixture having an R containing 10 carbon atoms, from 0 to 95 weight percent of said compounds in said mixture having an R containing 12 carbon atoms, from 0 to 95 weight percent of said compounds in said mixture having an R containing 14 carbon atoms, from 0 to 95 weight percent of said compounds in said mixture having an R containing 16 carbon atoms, from 0 to 50 weight percent of said compounds in said mixture having an R containing 18 carbon atoms, and from 0 to 10 weight percent of said compounds in said mixture having an R containing 20 carbon atoms, the above weight percents based on a total of 100 weight percent. The R—O— in the foregoing formula may be defined as the residue of the alcohol mixture employed in the condensation reaction, i.e., the alcohol mixture with the hydrogens in the OH radicals removed.

The term "cogeneric mixture", as used herein, designates a series of closely related homologues that are obtained by condensing a plurality of oxide units with a mixture of aliphatic alcohols. (See U.S. Pat. No. 2,549,438, particularly column 2, line 40 et seq.). As is known, when a mixture of compounds of this type is generated, various oxyalkylene chain lengths are obtained. Throughout this application when the values of "a" and "b" are referred to, average values are meant.

It has been found that alkali metal salts of an organic thiol acid having at least one -SH group when added to the foregoing polyoxyalkylene polymers can significantly shift the critical solution temperature of an aqueous solution of a polymer. The term "alkali metal" for the purpose of this invention is construed to mean the alkali metals of column 1 of the periodic table, that is, lithium, sodium, potassium. rubidium and cesium plus the ammonium ion ($NH_4^+$) and, preferably, the alkali metal will be sodium, potassium or the ammonium ion. The monomeric organic thiol acids of this invention are embraced within the class of di lower alkyl dithiocarbamic acids wherein the alkyl group contains 1 to 6 carbon atoms, thioglycolic acid and mercaptobenzothiazole.

The amount of monomeric organic thiol acid salt to be added will vary depending upon the polymer and the degree to which the cloud point is to be shifted. For instance, with regard to the polymer, the amount of ethylene oxide in the polymer plus the number of chains originating from the initiator of the polymer and whether the polyethoxy groups are contained internally or terminally on the polymer chain effect the hydrophile/hydrophobe qualities of the polymer and its cloud point. In any given composition, the polyoxyalkylene polymer or the monomeric organic thiol acid can be in the range of 1 to 60 percent each with the total of both combined being in the range of from 10 to 75 percent of the total aqueous composition. This concentrate can then be diluted with water for final use, e.g., in cutting and grinding fluids the dilution can be from 100 to 200 parts of water per part of concentrate. By the way of explanation, it should be noted that in context of this application the critical solution temperature of an aqueous solution can also be considered its cloud point. That is, the temperature at which the solution becomes cloudy as it is heated.

The cloud point test is carried out by heating a 10 weight percent solution of the test composition in distilled water in a test tube placed in a water bath. The water bath is gradually heated at a rate of about one degree a minute and so that the bath temperature is not more than 5–10 degrees centigrade higher than the test solution particularly near the cloud point. The test solution is agitated by a low-speed propellertype stirrer and the cloud point observation of the test solution is made against a dark background. The cloud point is taken as the temperature at which definite milky striations or minute but discrete particles of a separate phase are observed.

The compositions described herein are useful for applications such as cutting and grinding fluid concentrates which are water dilutable. In addition, similar concentrates, when diluted with water, are useful and effective as cooling system defoamers and corrosion inhibitors. These applications generally require low foaming characteristics which are characteristic of the preferred polyalkylene polymers of this application.

The following examples are included to illustrate the preparation of the compositions of the present invention but are not to be considered limiting. Unless otherwise specified, all temperatures are expressed in degrees centigrade and all parts are by weight.

EXAMPLE 1

A dilute surfactant solution composed of 90 parts of water and 10 parts of a hydrophobic surfactant block polymer having a total molecular weight of approximately 2,000 and prepared by adding ethylene oxide to both ends of a polypropoxy propylene glycol base with a molecular weight of approximately 1,750. The surfactant is commercially available under the trademark PLURONIC L-61.

The cloud point of a 100-gram aliquot of the surfactant solution was found to be 27°. Thereafter, varying amounts of a 50 percent aqueous solution of sodium dibutyldithiocarbamate (hereinafter referred to as SDBDTC) as the hydrophobe coupler and cloud point suppressant was added with constant stirring and the cloud point determined at various temperatures. The results are tabulated below in Table I:

TABLE I

| Total mls. of Coupler | Appearance of Solution | Temperature, °C. |
|---|---|---|
| 0 | Cloudy | 27 |
| 5 | Clear | 35 |
| 5 | Cloudy | 36 |
| 15 | Clear | 70 |
| 15 | Cloudy | 71 |
| 20 | Clear | 79 |
| 20 | Cloudy | 80 |

EXAMPLE 2

Following the procedure of Example 1, to another 100 grams aliquot of the surfactant solution was gradually added a 50 percent by weight aqueous solution of sodium salt of mercaptobenzothiazole (hereinafter referred to as NaMBT) as the hydrotrope coupler. The resulting cloud point determinations are recorded in Table II below:

TABLE II

| Total mls. of Coupler | Appearance of Solution | Temperature, °C. |
|---|---|---|
| 1.6 | Clear | 25 |
| 2.2 | Clear | 35 |
| 6.0 | Clear | 45 |
| 10.0 | Clear | 55 |
| 17.3 | Clear | 65 |

EXAMPLE 3

Following the procedures of Examples 1 and 2, another surfactant water solution was prepared. The surfactant was a block polymer having a total molecular weight of approximately 2,500 and prepared by adding ethylene oxide to both ends of a polypropoxy propylene glycol base having a molecular weight of approximately 1,750. This surfactant is commercially available under the trademark PLURONIC L-62. The results obtained are tabulated in Table III below:

TABLE III

| | Total mls. of Coupler | Appearance of Solution | Temperature, °C. |
|---|---|---|---|
| Coupler: | SDBDTC | | |
| | 0 | Clear | 29 |
| | 1 | Clear | 46 |
| | 1 | Cloudy | 47 |
| | 3 | Clear | 54 |
| | 3 | Cloudy | 55 |
| | 10 | Clear | 88 |
| | 10 | Cloudy | 89 |
| Coupler: | NaMBT | | |
| | 0 | Clear | 25 |
| | 0.1 | Clear | 35 |
| | 0.7 | Clear | 45 |
| | 2.3 | Clear | 55 |
| | 4.5 | Clear | 65 |

EXAMPLE 4

Following the procedures of Examples 1 and 2, another surfactant water solution was prepared. The surfactant was a block polymer having a total molecular weight of approximately 2,650 and prepared by adding ethylene oxide to both ends of a polypropoxy propylene glycol base having a molecular weight of approximately 1,750. This surfactant is commercially available under the trademark PLURONIC L-63. The results obtained are tabulated in Table IV below:

TABLE IV

| | Total mls. of Coupler | Appearance of Solution | Temperature, °C. |
|---|---|---|---|
| Coupler: | SDBDTC | | |
| | 0 | Cloudy | 29 |
| | 2 | Clear | 40 |
| | 2 | Cloudy | 41 |
| | 6 | Clear | 55 |
| | 6 | Cloudy | 56 |
| | 10 | Clear | 75 |
| | 10 | Cloudy | 76 |
| Coupler: | NaMBT | | |
| | 1.2 | Clear | 29 |
| | 2.7 | Clear | 43 |
| | 4.5 | Clear | 52 |
| | 8.2 | Clear | 61 |

EXAMPLE 5

Using the procedure of Example 1, still other surfactant solutions were prepared and the effect of NaMBT on their cloud points determined. These results are tabulated in Table V below:

TABLE V

| Total mls. of NaMBT Coupler to Clear Appearance | Temperature, °C. |
|---|---|
| Surfactant A | |
| 16.8 | 50 |
| 19.5 | 65 |
| 20.0 | 78 |
| Surfactant B | |
| 0 | 28 |
| 0.6 | 50 |
| 2.2 | 59 |
| 3.3 | 63 |

TABLE V-Continued

| Total mls. of NaMBT Coupler to Clear Appearance | Temperature, °C. |
|---|---|
| 4.5 | 67 |
| Surfactant C | |
| 0.6 | 28 |
| 1.5 | 38 |
| 3.1 | 44 |
| 5.0 | 49 |
| 7.0 | 53 |
| 10.0 | 60 |
| Surfactant D | |
| 0 | 25 |
| 0.2 | 35 |
| 1.3 | 45 |
| 3.2 | 55 |
| 6.1 | 65 |
| Surfactant E | |
| 0.15 | 25 |
| 1.2 | 35 |
| 3.7 | 45 |
| 9.0 | 55 |
| 15.0 | 65 |
| Surfactant F | |
| 0 | 25 |
| 18.5 | 35 |
| 25.4 | 45 |
| 39.0 | 55 |
| 50.0 | 65 |
| Surfactant G | |
| 12 | 65 |
| Surfactant H | |
| 3.5 | 65 |

Surfactant A is an ethoxylated fatty alcohol having a molecular weight of about 365 and sold under the trademark PLURAFAC A-24.

Surfactant B is an ethoxylated fatty alcohol having a molecular weight of about 600 and sold under the trademark PLURAFAC RA-30.

Surfactant C is an ethoxylated fatty alcohol having a molecular weight of about 880 and sold under the trademark PLURAFAC RA-40.

Surfactant D is an ethoxylated propoxylated ethylene diamine sold under the trademark TETRONIC 702 wherein 20 percent of the total molecule is ethoxy groups.

Surfactant E is an alkoxylated propoxylated ethylene diamine sold under the trademark TETRONIC 701 wherein 10 percent of the total molecule is ethoxy groups.

Surfactant F is polypropylene glycol having a molecular weight of 2,000 and was included for its extremely high hydrophobe characteristics.

Surfactant G is a nonionic liquid polyether based on alkoxylated triols having a molecular weight of 4.600 and an ethylene content of about 30 percent and sold under the trademark PLURADOT HA-510.

Surfactant H is a nonionic liquid polyether based on alkoxylated triols having a molecular weight of 5,300 and having an ethylene oxide content in excess of 30 percent and sold under the trademark PLURADOT HA-530.

Similar results are obtained when the sodium salt of dimethyldithiocarbamic acid is substituted for the dibutyldithiocarbamic salt in the above examples. In a similar manner blends of a dialkyldithiocarbamic acid salt and a mercaptobenzothiazole salt can be employed.

EXAMPLE 6 - COMPARISON

By way of comparison and as a point of reference, several well-known hydrotrope couplers of the prior art were also evaluated. The procedures of Example 1 were used in determining the amount of hydrotrope required to give a clear solution at 65° C. to the various surfactant solutions. The results are tabulated in Table VI below:

TABLE VI

| Surfactant Solution of Example | Hydrotrope Required to Obtain Clear Solution 65° C., mls. | | | |
|---|---|---|---|---|
| | Propylene Glycol | Hexylene Glycol | Isopropyl Alcohol | Methyl Alcohol |
| 1 | 200 | 75 | 60 | 90 |
| 3 | 40 | 35 | 25 | 35 |
| 4 | 200 | 50 | 40 | 70 |
| 5 E | 200 | 70 | | |
| 5 D | 73 | | | |
| 5 A | 70 | | | |

The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. The method of raising the critical solution temperature of an aqueous concentrated solution of a liquid polyoxyalkylene polymer surfactant containing a maximum of 20 percent by weight ethylene oxide units the balance of the polymer being made up of polyoxyalkylene units wherein each oxyalkylene unit has three, four or five carbon atoms or mixtures thereof and an initiator selected from the group consisting of ethylene glycol, propylene glycol, fatty alcohols, diamines and water by adding to said solution an alkali metal salt of an organic thiol acid having at least one -SH group, said thiol acid being selected from the group consisting of di lower alkyl dithiocarbamic acid, thioglycolic acid and mercaptobenzothiazole, said thiol acid and said polymer each being present in an amount from 1 to 60 percent with the total of both combined being in an amount of from 10 to 75 percent.

2. The method of claim 1 wherein the thiol is an alkali metal salt of a di lower alkyl dithiocarbamic acid.

3. The method of claim 1 wherein the thiol is an alkali metal salt of thioglycolic acid.

4. The method of claim 1 wherein the thiol is an alkali metal salt of mercaptobenzothiazole.

5. The method of claim 1 wherein the thiol is a sodium salt.

* * * * *